United States Patent
Saxena et al.

(10) Patent No.: US 9,304,700 B2
(45) Date of Patent: Apr. 5, 2016

(54) METHOD AND SYSTEM FOR REMOTELY CONTROLLING A STORAGE SHELF OF A STORAGE SYSTEM

(71) Applicant: NETAPP, INC., Sunnyvale, CA (US)

(72) Inventors: Mayank Saxena, Fremont, CA (US); Rohan Gupta, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 334 days.

(21) Appl. No.: 13/865,545

(22) Filed: Apr. 18, 2013

(65) Prior Publication Data

US 2014/0317431 A1    Oct. 23, 2014

(51) Int. Cl.
G06F 1/32      (2006.01)
G06F 3/06      (2006.01)

(52) U.S. Cl.
CPC ............ *G06F 3/0625* (2013.01); *G06F 3/0605* (2013.01); *G06F 3/0634* (2013.01); *G06F 3/0689* (2013.01); *G06F 1/3203* (2013.01)

(58) Field of Classification Search
CPC .................................................... G06F 1/3287
USPC ......................................................... 713/324
See application file for complete search history.

(56) References Cited

U.S. PATENT DOCUMENTS

| | | | |
|---|---|---|---|
| 4,254,473 A * | 3/1981 | Galdun et al. ..................... 710/2 |
| 8,099,624 B1 | 1/2012 | Saxena et al. |
| 2002/0057206 A1 * | 5/2002 | Reynolds ....................... 713/300 |
| 2004/0225903 A1 * | 11/2004 | Hirezaki et al. ............... 713/300 |
| 2006/0031454 A1 * | 2/2006 | Ewing et al. ................... 709/223 |
| 2006/0230186 A1 * | 10/2006 | Lucas ........................... 709/251 |
| 2008/0098194 A1 * | 4/2008 | Hashimoto et al. ........... 711/173 |
| 2008/0126635 A1 * | 5/2008 | Kawai et al. .................. 710/105 |
| 2009/0281676 A1 * | 11/2009 | Beavis et al. ................. 700/295 |
| 2012/0246492 A1 * | 9/2012 | Ho et al. ....................... 713/300 |

* cited by examiner

*Primary Examiner* — Thomas Lee
*Assistant Examiner* — Volvick Derose
(74) *Attorney, Agent, or Firm* — LeClairRyan, a Professional Corporation

(57) ABSTRACT

System and method for remotely performing a power cycle operation for a storage shelf of a storage server using a control path independent of a data path used for processing I/O requests is provided. The storage server maintains a data structure for storing information regarding a state of a plurality of power latches that are used to control power for the storage shelf having an alternate control path module for receiving control commands via the control path. Depending on the state of the plurality of power latches, the storage server sends one or more commands to the alternate control path module to turn off power to the storage shelf during a power cycle operation. When the power shelf is powered off, the storage server waits for a certain duration and then sends one or more power on commands to the alternate control path module to power on the storage shelf.

18 Claims, 6 Drawing Sheets

METHOD AND SYSTEM FOR REMOTELY CONTROLLING A STORAGE SHELF OF A STORAGE SYSTEM

TECHNICAL FIELD

The present disclosure relates to managing storage shelves in a storage system.

RELATED ART

Various forms of network-based storage systems exist today. These forms include network attached storage (NAS), storage area networks (SANs), and others. Network storage systems are commonly used for a variety of purposes, such as providing multiple users with access to shared data, backing up critical data (e.g., by data mirroring), and the like.

A network-based storage system typically includes at least one storage server, which is a processing system configured to store and retrieve data on behalf of one or more client processing systems ("clients"). A storage server operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups. A storage server provides clients with file-level access. Some storage servers may additionally provide block-level access.

Current storage systems are generally packaged in either of two main forms: 1) an all-in-one custom-designed system that is essentially a standard computer with built-in storage devices, all in a single chassis ("enclosure"), or 2) a modular system in which one or more sets of storage devices, each in a separate chassis, are connected to an external storage server in another chassis. A modular system can be built up by adding multiple chassis in a rack, and then cabling the chassis together. The storage device enclosures in a modular system are often called "shelves," "storage shelf," or "storage shelves."

A client may want to remotely power cycle (i.e. first power off and then power on), power on or power off a storage shelf to optimize power usage, remove power supplies that may not be operational, for storage shelf recovery or otherwise. It is desirable to perform these operations without significantly impacting processing of client input/output (I/O) requests. Continuous efforts are being made to better manage storage shelves in a storage system.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Figure 1:
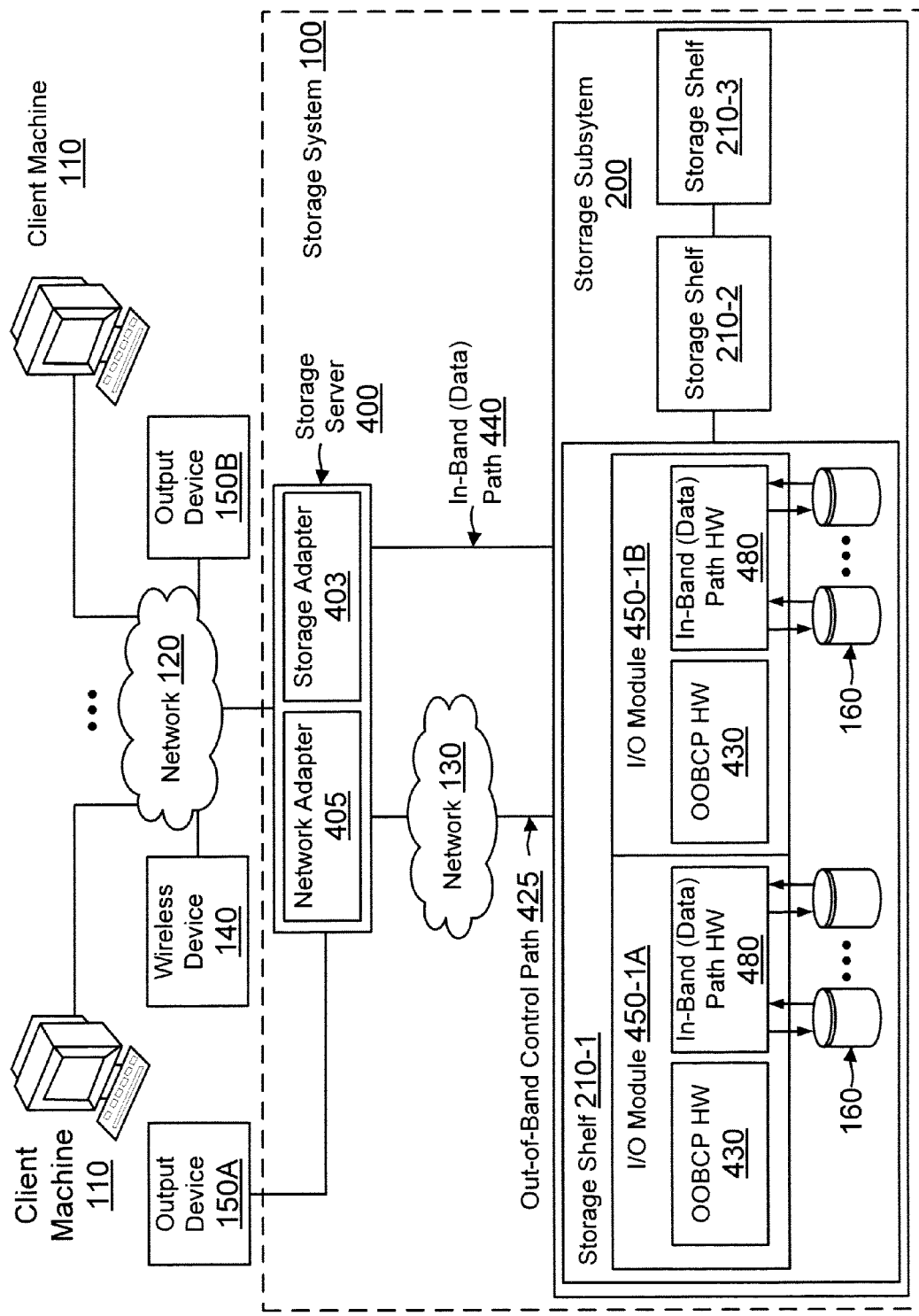
FIG. 1 illustrates an embodiment of a networked storage system.

In the following detailed description of the embodiments, reference is made to the accompanying drawings in which like references indicate similar elements, and in which is shown by way of illustration specific embodiments in which the present disclosure may be practiced. These embodiments are described in sufficient detail to enable those skilled in the art to practice the embodiments, and it is to be understood that other embodiments may be utilized and that logical, mechanical, electrical, functional, and other changes may be made without departing from the scope of the present disclosure. The following detailed description is, therefore, not to be taken in a limiting sense, and the scope of the present disclosure is defined only by the appended claims.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

An in-band path, also known as a data path, is a communications path to access data stored at storage devices of a storage shelf. A storage server sends client requests to a storage subsystem using the in-band (data) path for accessing data stored at the storage devices. In one embodiment, a second control path, independent of the data path is provided. The control path can be used to remotely power on or off or execute a power cycle operation on a storage shelf, as described below in detail.

In one embodiment, a system and method for remotely performing a power cycle operation for a storage shelf having an alternate control path module of is provided. The power cycle operation is executed using a control path independent of a data path used for processing I/O requests is provided. A storage server coupled to the storage shelf maintains a data structure for storing information regarding a state of a plurality of power latch circuits (may also be referred to as power latch or power latches) that are used to control power for the storage shelf.

Depending on the state of the plurality of power latches, the storage server sends one or more commands to the alternate control path module to turn off power to the storage shelf during the power cycle operation. The power cycle operation is aborted when the storage shelf is not powered off within a threshold duration. When the power shelf is powered off within the threshold duration, then the storage server waits for a certain duration and then sends one or more power on commands to the alternate control path module to power on the storage shelf.

FIG. 1 shows a network storage system 100 having a storage server 400 using the control architecture of the present embodiments. The storage server 400 may be a file server in which the control architecture of the present disclosure can be implemented. It should also be noted that the control architecture can be applied in other types of storage systems, such as storage servers, which provide clients with either or both block-level access and file-level access to stored data, or processing systems other than storage servers, and network devices configured to provide storage services.

The storage server 400 is coupled and manages a storage subsystem 200 which includes an array of mass storage devices 160 available to a set of storage client computing machines/devices 110 (hereinafter simply "clients") through a network 120. The mass storage devices 160 in the storage subsystem 200 can be, for example, conventional magnetic disks, optical disks such as CD-ROM or DVD-based storage, magneto-optical (MO) storage, or any other type of non-volatile storage devices suitable for storing structured or unstructured data. In one embodiment, the mass storage devices 160 are each a flash-based solid-state device (SSD), sometimes known as flash drives. The storage devices 160 can further be organized as a Redundant Array of Inexpensive Disks/Devices (RAID), whereby the storage server 400 accesses the storage devices 160 using one or more RAID protocols known in the art.

The network 120 may be, for example, a local area network (LAN), a wide area network (WAN), a metropolitan area network (MAN), a wireless network, a global area network (GAN) such as the Internet, a Fibre Channel fabric, or the like, or a combination of any such types of networks. The network 120 can include any number of networking and computing devices such as wired and wireless devices 140. Each of the clients 110 can be, for example, a conventional personal computer (PC), server-class computer, workstation, or the like.

In one embodiment, the storage server 400 and the storage subsystem 200 form a modular system in which one or more sets of mass storage devices 160 each in a separate chassis ("enclosure"), are connected to the storage server 400 in another chassis via network 130. The network 130 can be, for example, a local area network (LAN), a wide area network (WAN), a metropolitan area network (MAN), a wireless network, a global area network (GAN) such as the Internet, a Fibre Channel fabric, or the like, or a combination of any such types of networks.

The enclosures for the storage devices 160 are herein referred to as "shelves," "storage shelf," or "storage shelves." The storage server 400 is coupled to a number of external storage shelves 210-1 to 210-3. Each storage shelf 210-1 to 210-3 includes at least one I/O Module having access to storage devices 160 operated under control of the storage server 400. For example, the storage shelf 210-1 includes two I/O modules 450-1A and 450-1B. I/O module 450-1B is a partner module to I/O module 450-1A and I/O module 450-1A is a partner module to I/O module 450-1B. I/O module 450-1A, 450-1B serve as a communications interface between the storage server 400 and the storage devices 160 in the storage shelf 210-1. The storage devices 160 in the storage shelf 210-1 can be connected to the I/O module 450-1 by a standard Fibre Channel connection or any other connection type.

The storage server 400 receives and responds to various read and write requests from the clients 110, that are directed to data stored in, or to be stored at, the mass storage devices 160. The storage server 400 includes a storage adapter 403 coupled to the I/O modules 450-1A, 450-1B in the storage subsystem 200 creating an in-band (data) path 440 to access the data stored in, or to be stored in, the mass storage devices 160. The storage adapter 403 is coupled to an in-band (data) path hardware 480 of the I/O modules 450-1A, 450-1B to create the in-band path 440.

The storage server 400 also includes a network adapter 405 coupled to an out-of-band control path (OOBCP) hardware (or alternate path control module) 430 of the I/O modules 450-1A, 450-1B creating an out-of-band control path 425 for managing remote power cycle operations for the storage shelves, as described below in detail. During a power cycle operation, a storage shelf is first powered off and then after certain duration, powered on.

The storage server 400 may output status information regarding the storage shelf to one or more clients 110 and wireless devices 140. The storage server 400 also outputs I/O module status data to an output device 150A,B (e.g., display unit, printer) coupled to the storage server 400. The storage server 400 is locally coupled to an output device 150A or communicates to an output device 150B via network 120.

Figure 2:
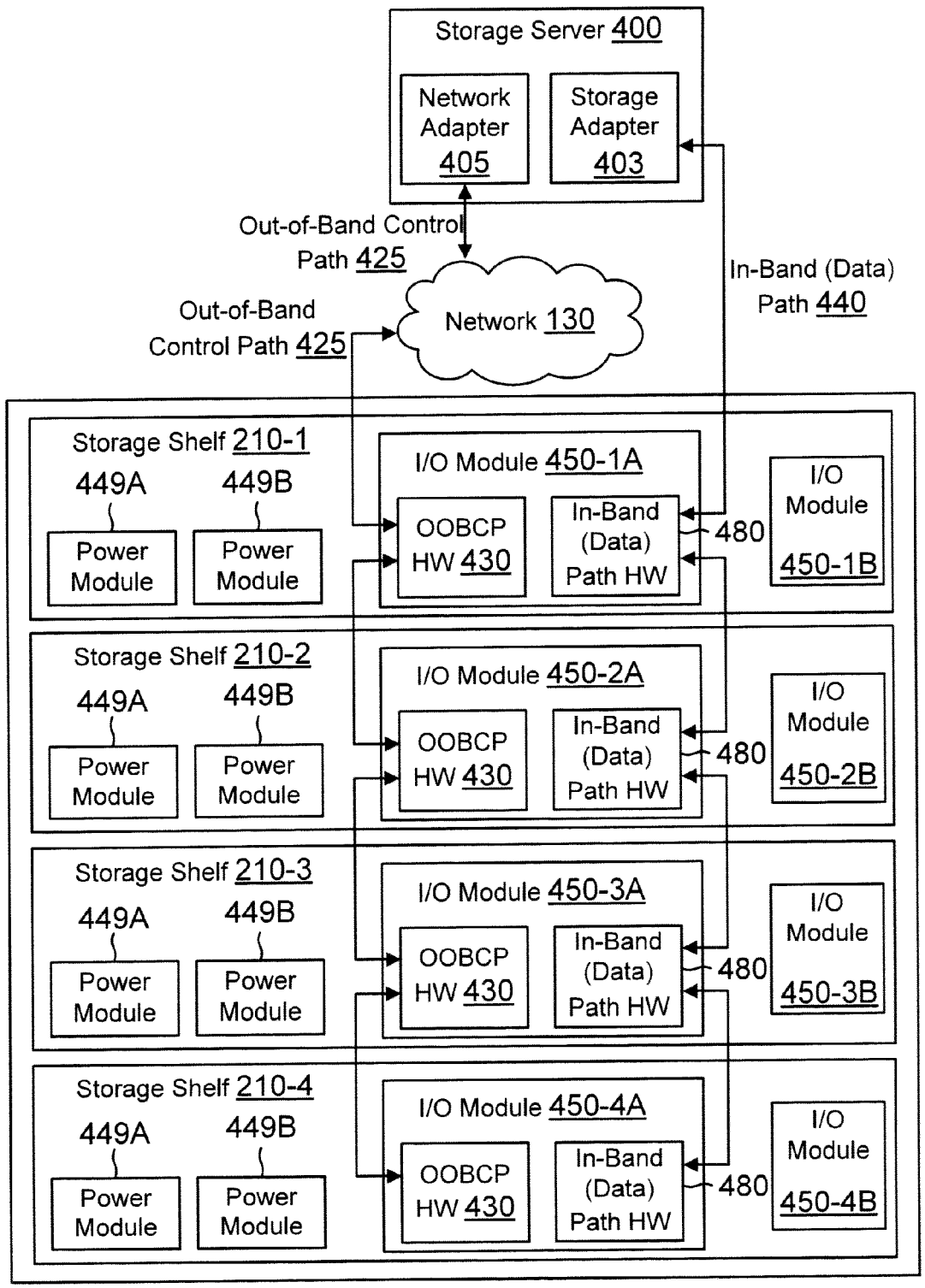
FIG. 2 illustrates another embodiment of a networked storage system.

FIG. 2 shows another example of a networked storage system configuration where the storage server 400 is coupled to four external storage shelves 210-1 to 210-4, illustratively, in a loop topology via network 130. A person of ordinary skill in the art would appreciate that the control architecture described herein can be applied to any storage shelf topology, including, but not limited to, Fibre Channel-Arbitrated Loop (FC-AL), Serial Attached Small Computer System Interface (SAS), Internet Small Computers Systems Interface (iSCSI), and the like. There can be a greater or smaller number of storage shelves 210-1 to 210-4 in the loop, there can be more than one loop attached to the storage server 400, or there can be one loop for every storage shelf 210-1 to 210-4.

In the embodiment of FIG. 2, each of the storage shelves 210-1 to 210-4 may have the same construction. Each storage shelf 210-1 to 210-4 includes multiple storage devices and at least one I/O module 450-1A/1B (or 450-2A/2B, 450-3A/3B and 450-4A/4B), which is connected between two adjacent storage shelves in the loop, or, depending on where the shelf is placed in the loop, is connected between an adjacent storage shelf 210-1 and the storage server 400. For example, I/O module 450-2A is connected between storage shelf 210-1 and storage shelf 210-3, and I/O module 450-1 is connected between storage shelf 210-2 and storage server 400.

Each storage shelf may receive power from at least one power module. For example each storage shelf may have two power modules 449A and 449B that are provided to power each storage shelf and its components, for example, storage devices 160 and the I/O Modules. In one embodiment, as described below in detail, storage shelves may be remotely power cycled (i.e. powered off and then powered on) using the control path 425

The storage adapter 403 coupled to, for example, I/O module 450-1A in the storage subsystem 200 creates the in-band path 440 to access the data stored in the mass storage devices in storage shelf 210-1. The storage adapter 403 is coupled to the in-band (data) path hardware 480 on I/O module 450-1A to create the in-band path 440. For example, the in-band path 440 can be created using Serial Attached SCSI (SAS) cables. The in-band path hardware 480 on storage shelf 210-1 can further be coupled to in-band path hardware 480 on another storage shelf 210-2.

The network adapter 405 on storage server 400 is coupled to OOBCP hardware 430 for creating the out-of-band control path 425. The network cabling (e.g., Ethernet cables) coupling the I/O modules and storage server 400 creates a complete network (e.g., Ethernet network) independent of the in-band path 440. This independent network creates the out-of-band control path 425 for remotely power cycling the storage shelf 210-1, as described below in detail.

Figure 3:
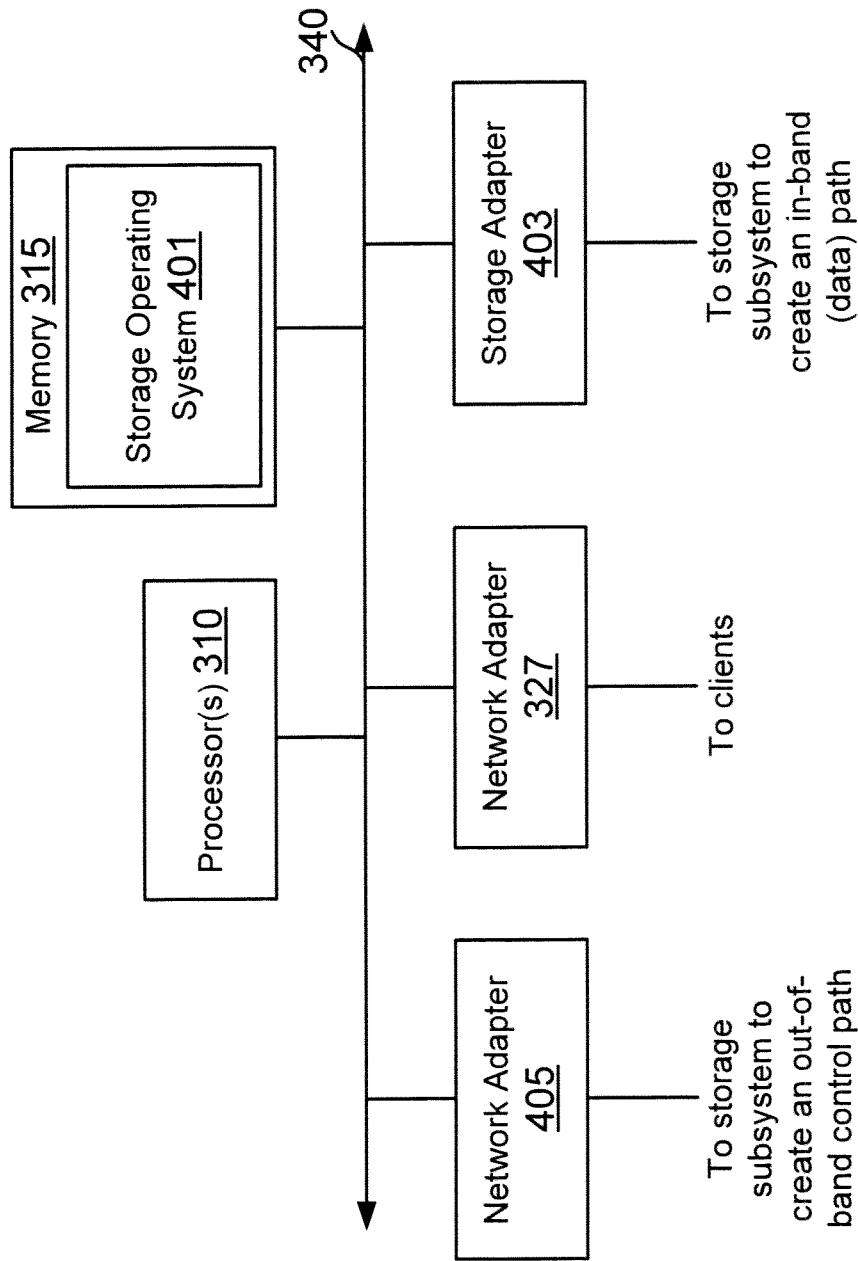
FIG. 3 illustrates an embodiment of the hardware architecture for implementing an out-of-band control path from a storage server to an I/O module in a storage subsystem.

FIG. 3 is a high-level block diagram showing an example of the architecture for storage server 400 which implements an out-of-band control path mechanism according to one embodiment. The storage server includes one or more processors 310 and memory 315 connected via an interconnect 340. Interconnect 340 represents any one or more separate physical buses, point to point connections, or both connected by appropriate bridges, adapters, or controllers. Interconnect 340, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire."

Processor(s) 310 may include central processing units (CPUs) of storage server 400 and thus controls the overall operations of storage server 400. In certain embodiments, processor(s) 310 accomplish this by executing firmware or software stored in memory 315. Processor(s) 310 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 315 is, or includes, the main memory of storage server 400. Memory 315 represents any form of random access memory (RAM), read-only memory (ROM), or the like. In use, memory 315 may contain a set of computer-executed instructions which, when executed by processor(s) 310, causes processor(s) 310 to perform operations to implement aspects of the present disclosure. In one embodiment, the out-of-band control path mechanism resides in memory 315 enabling storage server 400 to use the out-of-band control path as further discussed herein. The out-of-band control mechanism may be implemented in computer-executable software, firmware, hardware or some combination thereof, and is discussed further in reference to FIG. 4.

Network adapter 327 communicates with remote devices, such as clients 110 over network 120 of FIG. 1, to receive data access requests from the remote devices. As described above, storage adapter 403 creates the in-band (data) path to storage subsystem 200 and allows processor(s) 310 to access mass storage devices (e.g., storage devices 160 in FIG. 1) in the storage subsystem. Network adapter 405 is used to create the control path 425 that is also described below in detail.

Although illustrated as a self-contained element, the storage server may have a distributed architecture. For example, the storage server may include a separate N-("network") module (not shown) and D-("data") module (not shown). In such an embodiment, the N-module is used to communicate with remote devices, such as clients 110 over network 120 of FIG. 1, while the D-module includes the file system functionality and is used to communicate with an associated storage subsystem. The N-module and D-module can communicate with each other using an internal protocol. One embodiment of this disclosure can be operative in that the D-module is coupled to an I/O module, such as I/O module 450-1A in FIG. 4 described in greater detail below, and the Out-of-band Control Path Administrator (e.g., OOBCPA 420 in FIG. 4 described in greater detail below) can be executed by a processor of the D-module. Alternatively, the storage server can have an integrated architecture, where the network and data components are all contained in a single box, for example, as illustrated in FIG. 3.

Figure 4:
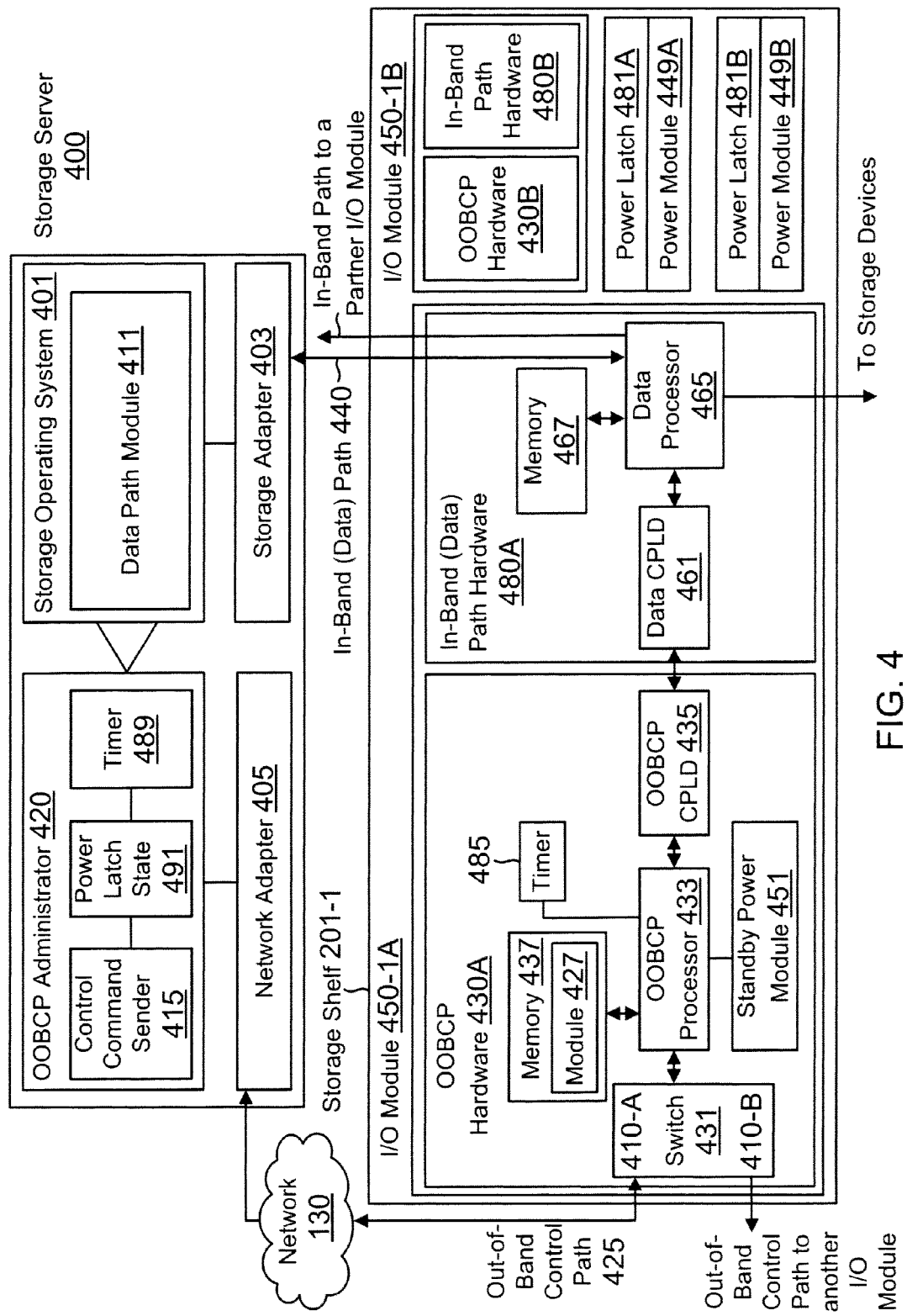
FIG. 4 illustrates an embodiment of a control architecture in a storage server, according to one embodiment.

FIG. 4 illustrates using the out-of-band control path 425 for remotely executing a power cycle operation during which a storage shelf is first powered off and after a certain duration, the storage shelf is powered up. The out of band control path 425 may also be used to simply power on or power off the storage shelf, according to one embodiment.

Processors 310 (FIG. 3) execute the OOBCPA 420 and the storage operating system 401 out of memory 315. In one embodiment, OOBCPA 420 may be a part of the storage operating system 401 or operate as an independent module and interface with operating system 401.

The OOBCPA 420 includes a control command sender module 416 that sends control commands via control path 425. The control command sender module 415 maintains a power latch state data structure 491 (may also be referred to as data structure 491) that stores the state of power latch 481A-481B. The power latch 481A is used to power on or power off the power module 449A, while power latch 481B is used to power on and power off the power module 449B.

As described below in detail, OOBCPA 420 periodically collects power latch state information from the storage shelf and regularly updates the state information at data structure 491. As an example, when power latch 481A is in the "on" state, OOBCPA 420 stores an identifier value identifying the power latch 481A and a bit value (for example, 1 or 0) to indicate that power latch 481A is in the on or off state. To power off a storage shelf, both power latch should be in the off state and to power on the storage shelf, one of the power latch state should be in the "on" state.

OOBCPA 420 also maintains a timer 489 to ensure that a power cycle operation is completed within a permissible (or threshold) duration. The permissible duration is based on what may be considered as an acceptable level of disruption in I/O processing via the in-band data path 440. A protocol (NFS, CIFS and others) supported by storage server 400 may define the permissible duration, for example, 40 seconds. The timer 489 tracks this duration to manage any disruption to clients during the power cycle operation.

Storage shelf 210-1 may communicate with OOBCPA 420 via a switch 431 to obtain the power latch states and other status information. In one embodiment, switch 431 is an Ethernet switch coupled to the storage server 400 via Ethernet cabling creating the out-of-band control path 425. In other embodiments, the switch 431 uses networking technology other than Ethernet (e.g., Fibre Channel) to create a network coupling OOBCP processors (e.g., OOBCP processor 433) to the storage server 400 independent of the network coupling data processors (e.g., data processor 465) to the storage server 400.

Regardless of the protocol, switch 431 may have an input port 410-A and an output port 410-B. In still other embodiments, the switch 431 can have more than two ports. The output port 410-B is coupled to an input port on a switch of another storage shelf, for example, 210-2 in FIG. 2. The input port 410-A is coupled to the network adapter 405 in the storage server 400.

The OOBCPA 420 maintains data for the various OOBCP processors of the storage shelves. The OOBCPA 420 maintains data that maps each OOBCP processor 433 to a corresponding port on an I/O module 450-1A. For example, OOBCP processor 433 described below corresponds to port 1 (410-A). The mapping data can be in the form of a mapping table, such as a routing table. In one embodiment, the mapping data is stored in memory 315 at the storage server 400.

When OOBCPA 420 receives a signal from a data path module 411 identifying a non-responsive I/O module and an OOBCP processor identifier, OOBCPA 420 accesses the mapping data to determine the port corresponding to the OOBCP processor on the non-responsive I/O module to initiate a power cycle operation, as described below.

The OOBCP hardware 430 (430A/430B) for each I/O module includes a memory 437 coupled to the OOBCP processor 433. The memory 437 may be used to execute a module 427 that is used to interface with OOBCPA 420 via the control path 425. Memory 437 may also be used to store state information for power latch 481A/481B as well as status information for the I/O module 450-1A/1B, for example, connection data, I/O module firmware version data, I/O module logs, voltage status data denoting the health of the power modules and other data type.

OOBCP processor 433 maintains a timer 485 to ensure that the storage shelf is powered back on during a power cycle operation within certain duration, as described below. If the storage shelf does not power on within the duration, then a standby power module (or power supply) 451 is used to power the storage shelf. The process for using timers 489 and 451 is described below in detail.

Storage server 400 illustrates an example of the storage operating system 401 for controlling the operations of the storage server 400. In one embodiment, the storage server 400 is a storage server product of NetApp, Inc., Sunnyvale, Calif., that uses the NetApp® Data ONTAP™ storage operating system. However, it is expressly contemplated that any appropriate storage server and storage operating system can be enhanced for use in accordance with the control architecture described herein. The storage operating system 401 and its constituent elements are preferably implemented in the form of software. However, in some embodiments, some or all of the elements of the operating system 401 may be implemented in the form of hardware (e.g., specially designed circuitry), or as a combination of hardware and software.

Storage operating system 401 includes several modules, or "layers" including the data path module 411 that interfaces with the storage adapter 403 to communicate with the in-band data path hardware 480A/480B (may be referred to as 480) of storage shelves for processing a client-initiated data command, such as a read or write request. Data path module 411 may include a sub-layer for tracking which I/O modules are coupled to the storage adapter 403 in the storage server 400. Data path module 411 may include another sub-layer that passes data commands (e.g., read command, write command) from the storage server 400 to an I/O module, for example, 450-1A via the storage adapter 403 to access storage devices 160 via the in-band path hardware 480A for accessing data stored on storage devices.

The in-band data path hardware 480A includes memory 467 coupled to the data processor 465 to store data associated with the data processor 465 and data associated with the storage devices (e.g., storage devices 160 in FIG. 1). The in-band data path hardware 480A may include a data Complex Programmable Logic Device (data CPLD) 461 and the OOBCP 430 may include an OOBCP CPLD 435. The OOBCP processor 433 programs the OOBCP CPLD 435 to program the data CPLD 461. The OOBCP CPLD 435 programs the data CPLD 461 to cause the data processor 465 to execute a control command for reading and writing data.

OOBCPA 420 interfaces with the data path module 411 to ensure that I/O requests are being processed. When I/O requests are not being processed adequately or otherwise, OOBCPA 420 may initiate a power cycle operation that is now described below.

Figure 5A:
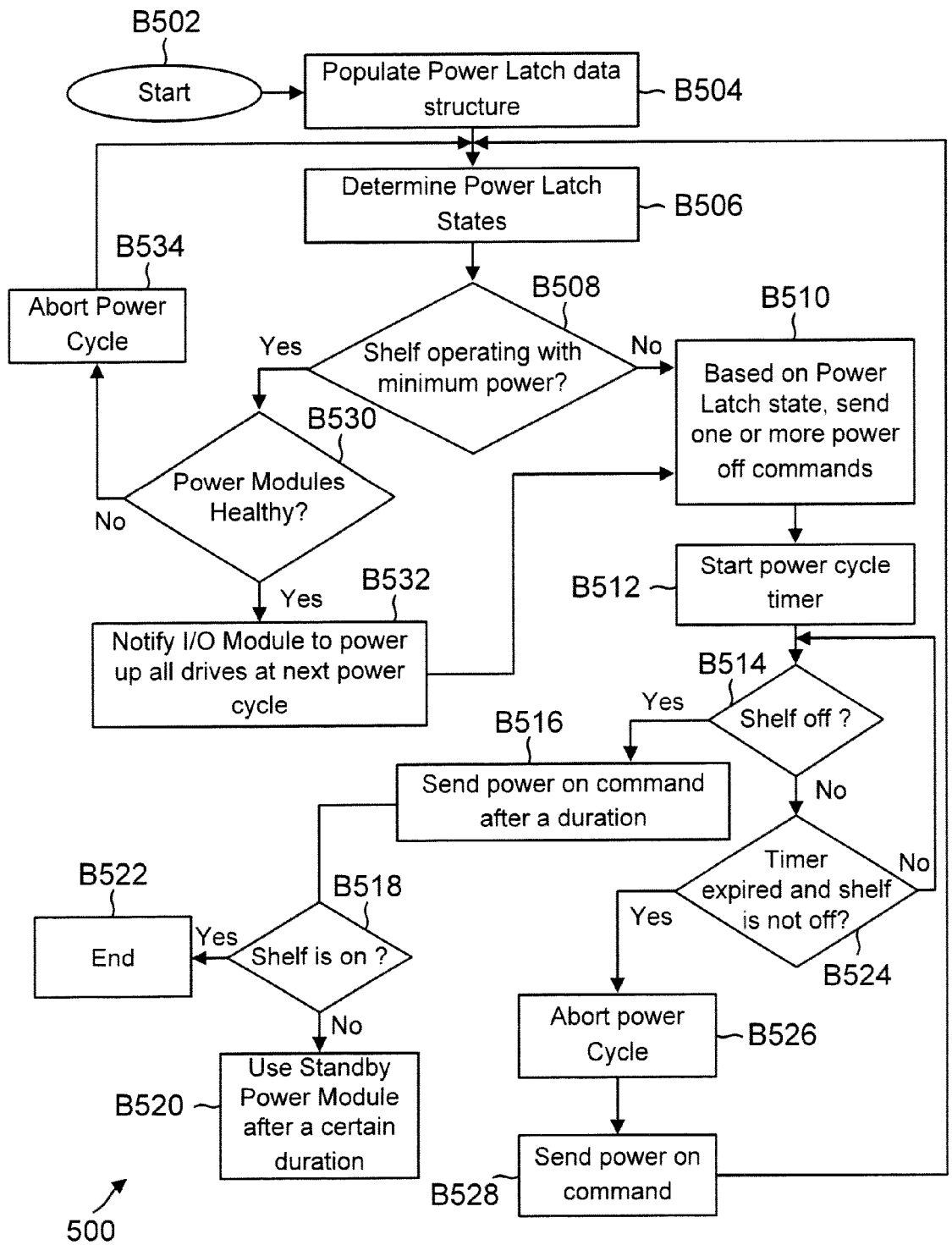
FIGS. 5A-5B show process flow diagrams, according to one embodiment.

FIG. 5A shows a process 500 for performing a power cycle operation for first powering off a storage shelf and then powering on the storage shelf within a pre-defined duration without causing disruption in processing I/O requests for reading and/or writing data at the storage devices 160 using the data path 440. The process begins in block B502.

The power cycle operation may be initiated when storage operating system 401 is not able to efficiently process I/O requests via the data path 440 or for any other reason. Before the power cycle operation is executed, in block B504, OOBCPA 420 populates the power latch data structure 491 by obtaining the state of each power latch 481A/481B. Control command sender 415 may periodically send a request via control path 425 to obtain power latch state information that is maintained by OOBCP 433 at memory 437. The power latch states are provided by module 427 via the control path 425.

In block B506, using data structure 491, OOBCPA 420 determines the power latch states to ascertain which power latch is on and which power latch is off. In block B508, OOBCPA 420 determines if the storage shelves are operating with minimum power. For example, if a storage shelf has two power modules, then OOBCPA 420 determines if the storage shelves are operating using only one of the power modules. This information again is obtained via the control path 425 and provided by module 427.

When minimum power is not used, the process moves to block B510, when OOBCPA 420 sends one or more power off commands to the storage shelf. The number of commands would depend on the state of the power latch circuits 481A and 481B at that instance. For example, if both the power latch circuits are in the on state, then two off commands are sent to power off, otherwise, only one command is sent. OOBCPA 420 also starts the timer 489 in block B512, to ensure that the power cycle operation is executed within a permissible (or threshold) duration without disrupting processing of I/O requests. As described above, the permissible duration may be provided by a protocol used by the storage server 400.

In block B514, OOBCPA 420 first determines if the storage shelf is powered off. If yes, then after certain duration, in block B516, a power on command is sent for the power modules using control path 425. The delay in sending the power on command is used to allow hardware components of the storage shelf to clear any memory and/or registers (not shown) of the I/O modules.

In block B518, the process determines if the storage shelf is on. If yes, the process ends in block B522. If the storage shelf is not on within certain duration, then the standby power module 451 is used to power on the storage shelf and the process ends.

Referring back to block B514, if the shelf is not on, then in block B524, OOBCPA 420 determines if the timer 489 has expired and the shelf is still off. If the timer has not expired, then the process simply waits. If the timer has expired and the shelf is still not off, then the power cycle is aborted in block B526 such that I/O processing via the data path is not disrupted. A power on command is then sent in block B528 and the process reverts back to block B506.

Now referring back to block B508, when the storage shelf is operating at minimum power, in block B530, OOBCPA 420 determines if the power modules 449A/449B are in a healthy state. OOBCPA 420 determines that by obtaining status information from OOBCP 433. OOBCPA 420 may obtain the status information periodically and store it with data structure 491. If the power modules are not in a healthy state, then the power cycle operation is aborted in block B534.

If the power modules are healthy then OOBCP processor 433 is notified to power up all the storage devices 160 in the next power on operation. The OOBCP processor 433 may store this information at memory 437. Thereafter, the process moves to block B510 that has been described above in detail.

Figure 5B:
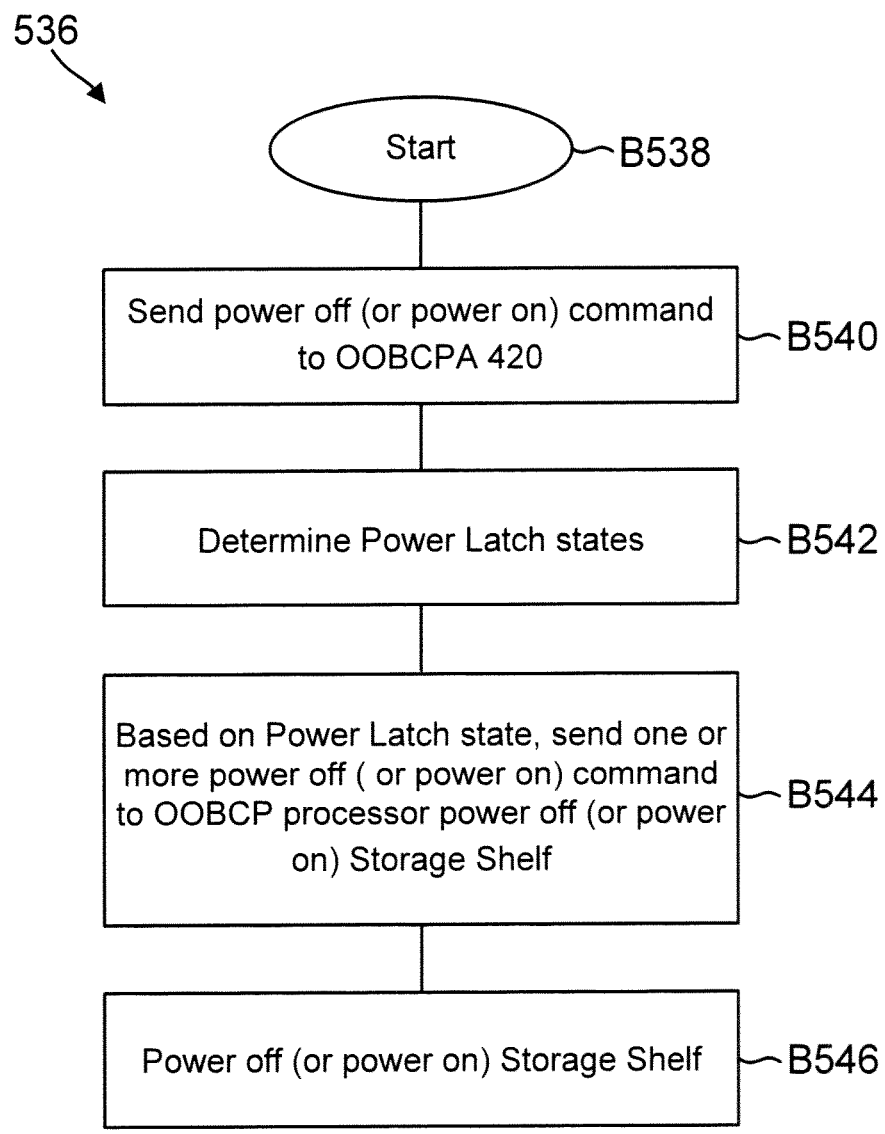

FIG. 5B shows a process 536 for remotely powering on or powering off a storage shelf, according to one embodiment. The process starts in block B538. In block B540, a power off or power on command is sent to OOBCPA 420. The OOBCPA 420 determines the state of the power latch circuits using data structure 491. Based on the power latch states, the OOBCPA 420 sends the power off (or on) commands. Thereafter, in block B546, depending on the command, the storage shelf is either powered on or powered off.

In one embodiment, an administrator is able to remotely execute a power cycle operation, power on or power off a storage shelf without impacting processing of I/O requests via the in-band data path.

Thus, a method and apparatus for remotely performing a power cycle operation have been described. Note that references throughout this specification to "one embodiment" or "an embodiment" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A method comprising:
   receiving, by a storage server, a plurality of power latch states corresponding to a plurality of power latches associated with a storage shelf, wherein the plurality of power latch states comprises a power status indication for the corresponding plurality of power latches;
   sending, by the storage server, a power off command to power off the storage shelf when the corresponding power latch status indication is that the plurality of power latches are in a powered on state;
   determining, by the storage server, after sending the power off command, when the storage shelf is in a powered off state; and
   sending, by the storage server, a power on command to power on the storage shelf when a predetermined time period after the storage shelf is determined to be in the powered off state has elapsed.

2. The method of claim 1, further comprising:
   aborting, by the storage server, a power cycle operation when the storage shelf is not powered off within the predetermined time period, the power cycle operation comprising the storage shelf receiving the power off command and the power on command.

3. The method of claim 1, further comprising:
   sending, by the storage server, additional power off commands, wherein the number of times the additional power off commands are sent is based on how many of the plurality of power latch states indicate that the corresponding plurality of power latches are in the powered on state.

4. The method of claim 1, further comprising:
   determining, by the storage server, a duration of the predetermined time period based on a file system protocol associated with the storage shelf.

5. The method of claim 1, further comprising:
   sending, by the storage server, the power on command to a standby power supply to power up the storage shelf, when the storage shelf is determined to be in the powered off state after the sending the power on command.

6. The method of claim 5, wherein the power on command is sent after a time threshold has elapsed.

7. A non-transitory machine readable medium having stored thereon instructions for performing a method comprising machine executable code which when executed by at least one machine, causes the machine to:
   receive a plurality of power latch states corresponding to a plurality of power latches associated with a storage shelf, wherein the plurality of power latch states comprises a power status indication for the corresponding plurality of power latches;
   send a power off command to power off the storage shelf when the corresponding power latch status indication is that the plurality of power latches are in a powered on state;
   determine, after sending the power off command, when the storage shelf is in a powered off state; and
   send a power on command to power on the storage shelf when a predetermined time period after the storage shelf is determined to be in the powered off state has elapsed.

8. The medium of claim 7, further having stored thereon instructions for performing a method comprising machine executable code which when executed by at least one machine, causes the machine to:
   determine a duration of the predetermined time period based on a file system protocol associated with the storage shelf.

9. The medium of claim 7, further having stored thereon instructions for performing a method comprising machine executable code which when executed by at least one machine, causes the machine to:
   abort a power cycle operation when the storage shelf is not powered off within the predetermined time period, the power cycle comprising the storage shelf receiving the power off command and the power on command.

10. The medium of claim 9, further having stored thereon instructions for performing a method comprising machine executable code which when executed by at least one machine, causes the machine to:
    send additional power off commands, wherein the number of times the additional power off commands are sent is based on how many of the plurality of power latch states indicate that the corresponding plurality of power latches are in the powered on state.

11. The medium of claim 7, further having stored thereon instructions for performing a method comprising machine executable code which when executed by at least one machine, causes the machine to:

send the power on command to a standby power supply to power up the storage shelf, when the storage shelf is determined to be in the powered off state after the sending the power on command.

12. The medium of claim 11, wherein the power on command is sent after a time threshold has elapsed.

13. A computing device comprising:
a memory containing a machine readable medium comprising machine executable code having stored thereon instructions for performing a method of controller replacement;
a processor coupled to the memory, the processor configured to execute the machine executable code to cause the processor to:
receive a plurality of power latch states corresponding to a plurality of power latches associated with a storage shelf, wherein the plurality of power latch states comprises a power status indication for the corresponding plurality of power latches; and
send a power off command to power off the storage shelf when the corresponding power latch status indication is that the plurality of power latches are in a powered on state;
determine, after sending the power off command, when the storage shelf is in a powered off state; and
send a power on command to power on the storage shelf when a predetermined time period after the storage shelf is determined to be in the powered off state has elapsed.

14. The device of claim 13, wherein the processor is further configured to be capable of executing programmed instructions, which comprise the programmed instructions stored in the memory to:

abort a power cycle operation when the storage shelf is not powered off within the predetermined time period, the power cycle operation comprising the storage shelf receiving the power off command and the power on command.

15. The device claim 13, wherein the processor is further configured to be capable of executing programmed instructions, which comprise the programmed instructions stored in the memory to:
send additional power off commands, wherein the number of times the additional power off commands are sent is based on how many of the plurality of power latch states indicate that the corresponding plurality of power latches are in the powered on state.

16. The device of claim 13, wherein the processor is further configured to be capable of executing programmed instructions, which comprise the programmed instructions stored in the memory to:
determine a duration of the predetermined time period based on a file system protocol associated with the storage shelf.

17. The device of claim 13, wherein the processor is further configured to be capable of executing programmed instructions, which comprise the programmed instructions stored in the memory to:
send the power on command to a standby power supply to power up the storage shelf, when the storage shelf is determined to be in the powered on state after the sending the power on command.

18. The device of claim 17, wherein the power on command is sent after a time threshold has elapsed.

* * * * *